United States Patent
Wu et al.

(10) Patent No.: US 9,063,255 B2
(45) Date of Patent: Jun. 23, 2015

(54) BACKLIGHT MODULE

(75) Inventors: Yu-Ping Wu, Hsin-Chu (TW); Fu-Cheng Fan, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 121 days.

(21) Appl. No.: 13/541,944

(22) Filed: Jul. 5, 2012

(65) Prior Publication Data

US 2013/0188393 A1    Jul. 25, 2013

(30) Foreign Application Priority Data

Jan. 20, 2012   (TW) .............................. 101102592 A (51) Int. Cl.
*F21V 8/00*    (2006.01)

(52) U.S. Cl.
CPC .................................. *G02B 6/0011* (2013.01)

(58) Field of Classification Search
CPC ...... G02B 6/42; G02B 6/0011; G02B 6/0013; G02B 6/0023; G02B 6/0028; G02B 6/0055; G02B 6/0066; G02B 6/0073; G02B 6/008; G02B 6/0078
USPC ......... 362/612, 608, 610, 613, 616, 623, 624, 362/625, 615, 628
See application file for complete search history.

(56) References Cited

U.S. PATENT DOCUMENTS

| | | | | |
|---|---|---|---|---|
| 6,021,007 A * | 2/2000 | Murtha | ........................ | 359/834 |
| 7,344,291 B2 * | 3/2008 | Hatanaka et al. | ............. | 362/610 |
| 7,540,646 B2 * | 6/2009 | Naoi | ............................. | 362/558 |
| 7,577,326 B2 * | 8/2009 | Amitai | ............................ | 385/36 |
| 8,002,450 B2 * | 8/2011 | Van Ostrand et al. | ........ | 362/606 |
| 8,534,899 B2 * | 9/2013 | Yu et al. | ........................ | 362/616 |
| 2007/0081360 A1 | 4/2007 | Bailey et al. | | |
| 2011/0228559 A1 * | 9/2011 | Kinder | ........................ | 362/608 |

FOREIGN PATENT DOCUMENTS

| | | |
|---|---|---|
| CN | 102141646 | 8/2011 |
| CN | 102352984 A | 2/2012 |
| TW | 200827852 | 7/2008 |

OTHER PUBLICATIONS

Taiwan Patent Office, "Office Action", Sep. 26, 2014.
China Patent Office, "Office Action", Feb. 16, 2015.

* cited by examiner

*Primary Examiner* — Laura Tso
(74) *Attorney, Agent, or Firm* — WPAT, PC; Justin King (57) ABSTRACT

A backlight module includes a light guide plate, a light coupling unit and a plurality of light emitting devices. The light guide plate has a light incident side. The light coupling unit includes a plurality of light coupling devices arranged in a side-by-side manner. Each light coupling device has a first side and a second side, and the first and second sides are opposite to each other. The second side is adjacent to the light incident side. Each light coupling device is configured to have a thickness gradually decreasing from the first side toward the second side. The light emitting devices are disposed beside the first sides of the light coupling devices. Another backlight module is also provided.

30 Claims, 10 Drawing Sheets

BACKLIGHT MODULE

TECHNICAL FIELD

The present disclosure relates to a backlight module, and more particularly to a backlight module capable of directing light to light guide plate through a light coupling unit.

BACKGROUND

Backlight module is one of an essential device in a liquid crystal display (LCD) and configured to provide display light for a LCD panel. Today, backlight module is required to have a slimmer thickness in response to the trend of compact features for an LCD device. Thus, a conventional structure of a backlight module is disclosed as illustrated in FIG. 1.

Figure 1:
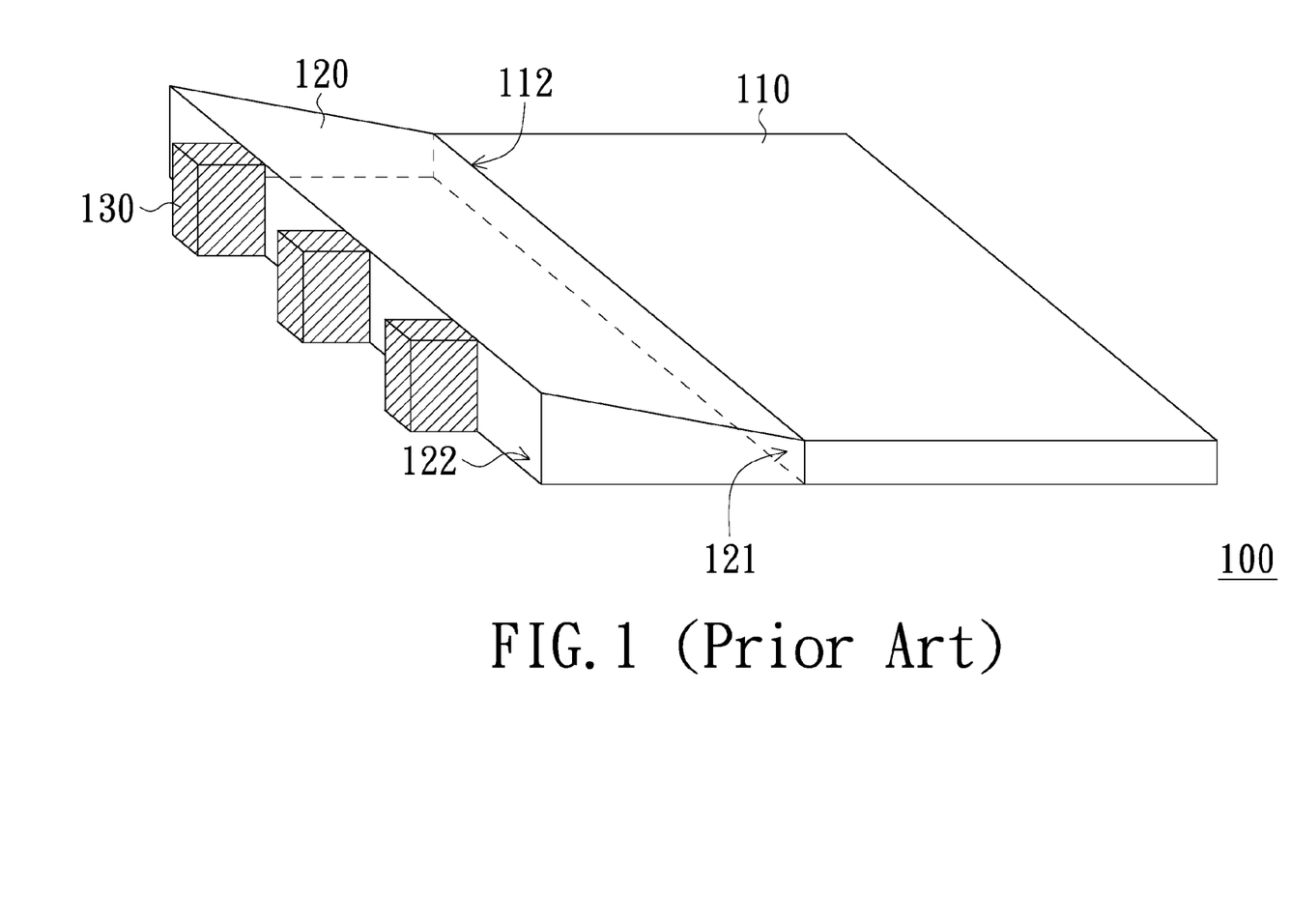
FIG. 1 is a schematic view of a conventional backlight module.

As shown in FIG. 1, the conventional backlight module 100 includes a light guide plate 110, a reflective cavity 120 and a plurality of light emitting devices 130. The reflective cavity 120 has an opening 121 and an end surface 122; wherein the opening 121 and the end surface 122 are configured to be opposite to each other. The light guide plate 110 has a side surface 112, which is configured to be jointed to the opening 121 of the reflective cavity 120. The light emitting devices 130 are disposed on the end surface 122 of the reflective cavity 120. In order to response the compact feature of the light guide plate 110, the reflective cavity 120, with a wedge shape and functioned as a light coupling device, is configured to direct the light provided from the light sources 130 to the inside of the light guide plate 110.

However, the reflective cavity 120, due to having a hollow structure, has a relatively weak structural strength and accordingly is deformed easily. Moreover, because the reflective cavity 120 has a larger size and needs a complicated manufacture process, it is quietly difficult to realize the mass production of the reflective cavity 120. In addition, the reflective cavity 120, due to the structural limit, is difficult to be assembled to the light guide plate 110 and consequently may result in relatively poor assembly efficiency.

SUMMARY

One object of the present disclosure is to provide a backlight module having a light coupling unit with an enhanced structural strength and an easy-to-production feature.

The disclosure provides a backlight module, which includes a light guide plate, a light coupling unit and a plurality of light emitting devices. The light guide plate has a light incident side. The light coupling unit includes a plurality of light coupling devices arranged in a side-by-side manner. Each light coupling device has a first side and a second side, and the first and second sides are opposite to each other. The second side is adjacent to the light incident side. Each light coupling device is configured to have a thickness gradually decreasing from the first side toward the second side. The light emitting devices are disposed beside the first sides of the light coupling devices.

The disclosure further provides a backlight module, which includes a light guide plate, a light coupling unit and a plurality of light emitting devices. The light guide plate has a light incident side. The light coupling unit is a solid structure and has a first side and a second side opposite to the first side. The second side is adjacent to the light incident side. The light coupling unit is configured to have a thickness gradually decreasing from the first side toward the second side. The light coupling unit further includes a first joint part. The light guide plate further includes a second joint part connected to the light incident side. The first joint part and the second joint part are configured to be jointed to each other. The light emitting devices are disposed beside the first side of the light coupling unit.

To sum up, in one embodiment, because being constituted by a plurality of light coupling devices, the light coupling unit can have an enhanced structural strength. In addition, because having a relatively small size, the light coupling device can have the advantage of easy-to-production. In another embodiment, because having a one-piece solid structure, the light coupling unit can have the advantages of enhanced structural strength and easy-to-production. In addition, through the joint of the first and second joint parts, the light coupling unit and the light guide plate can be assembled to each other more easily and conveniently.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 2A:
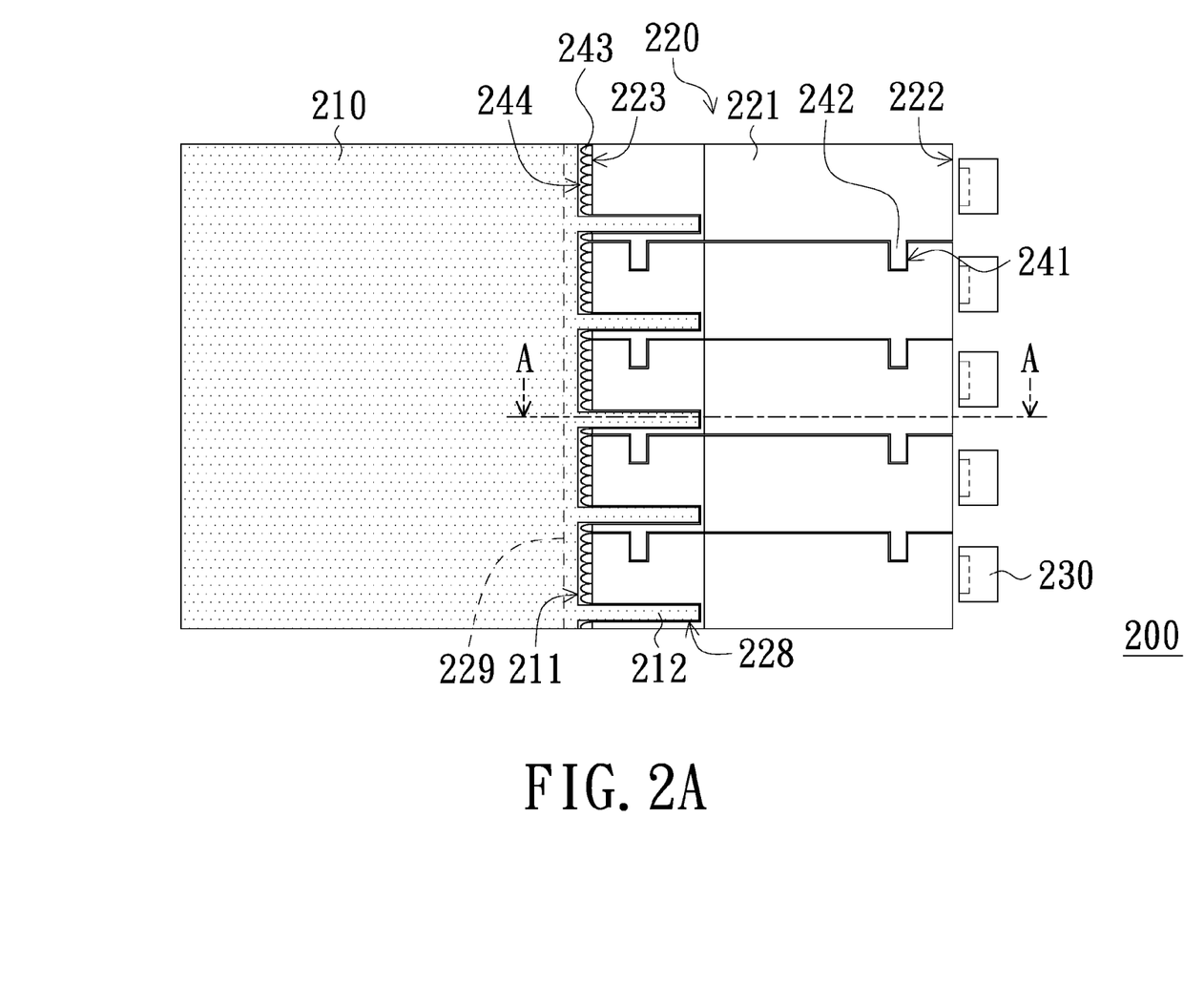
FIG. 2A is a schematic top view of a backlight module in accordance with an embodiment of the present disclosure.
Figure 2B:
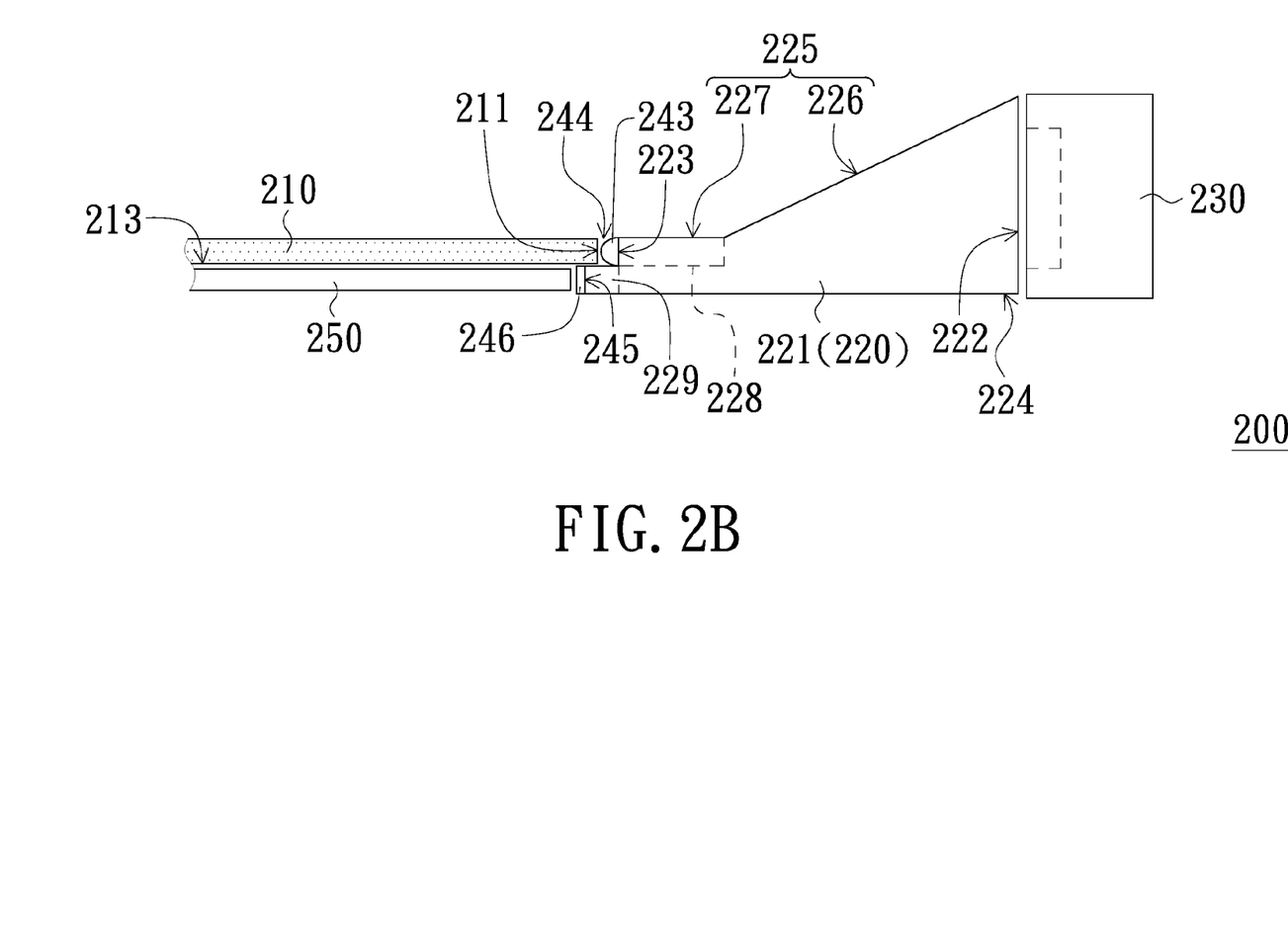
FIG. 2B is a schematic cross-sectional view of the backlight module in FIG. 1.
Figure 2C:
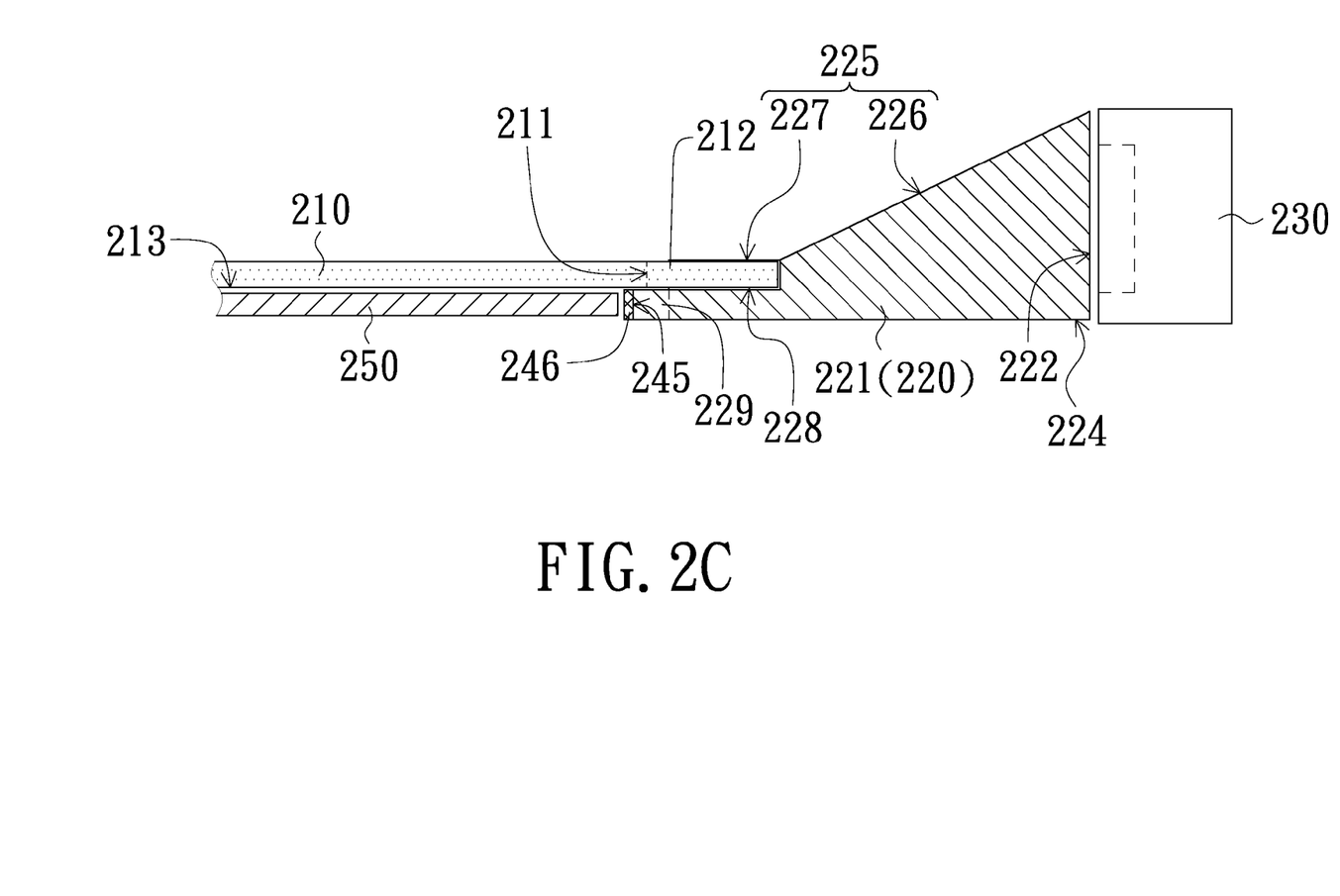
FIG. 2C is a schematic cross-sectional view of the backlight module along a line A-A in FIG. 2A.

FIG. 2A is a schematic top view of a backlight module in accordance with an embodiment of the present disclosure; FIG. 2B is a schematic cross-sectional view of the backlight module in FIG. 1; and FIG. 2C is a schematic cross-sectional view of the backlight module along a line A-A in FIG. 2A. Please refer to FIGS. 2A, 2B and 2C. The backlight module 200 includes a light guide plate 210, a light coupling unit 220 and a plurality of light emitting devices 230. The light guide plate 210 has a light incident side 211. The light coupling unit 220 includes a plurality of light coupling devices 221 arranged in a side-by-side manner. Each light coupling device 221 has a first side 222 and a second side 223; wherein the first side 222 and the second side 223 are configured to be opposite to each other, and the second side 223 is adjacent to the light incident side 211 of the light guide plate 210. Each light coupling device 221 is configured to have a thickness gradually decreasing from its first side 222 toward its second side 223. The light emitting devices 230 are disposed beside the first sides 222 of the light coupling devices 221; wherein the light emitting devices 230 each are, with no limitation, a light emitting diode. Specifically, the light emitting devices 230 and the first sides 222 of the light coupling devices 221 are disposed to be opposite to each other, respectively, and each light emitting device 230 is configured to provide light for its corresponding light coupling device 221. The light coupling device 221 is configured to direct the light into the light guide plate 210. The light guide plate 210 is configured to convert the light into display light sources for a display panel (not shown).

In the backlight module 200, the light coupling unit 220, due to being constituted by a plurality of light coupling devices 221, has an enhanced structural strength and consequently can be prevented from a deformation. Moreover, because having a relatively small size, each individual light coupling device 221, as well as the light coupling unit 220, accordingly can have some advantages such as easy-to-production. In addition, the structural strength of the light coupling unit 220 is further enhanced if the light coupling devices 221 each have a solid structure.

In this embodiment, each light coupling device 221 further has a bottom surface 224 and a top surface 225, both are connected to the first side 222 and the second side 223. The top surface 225 has a first portion 226, which is inclined relative to the bottom surface 224, and a second portion 227, which is parallel to the bottom surface 224; wherein, the second portion 227 is connected to the second side 223 and the first portion 226 is connected between the first side 222 and the second portion 227. In addition, each light coupling device 221 further has a first joint part 228, the light guide plate 210 further has a plurality of second joint parts 212 connected to the light incident side 211; wherein these first joint parts 228 and these second joint parts 212 are configured to be respectively jointed to each other so as to joint the light guide plate 210 and the light coupling unit 220 to each other. In this embodiment, the first joint part 228 is, for example, a joint groove and the second joint part 212 is, for example, a joint pillar; however, it is to be noted that the present disclosure does not limit the structures of the first joint part 228 and the second joint potion 212. In particular, the first joint part 228 and the corresponding second joint part 212 can be further adhered to each other through optical clear adhesive therebetween. In each light coupling device 221, the first joint part 228 is exposed from the top surface 225.

Figure 3:
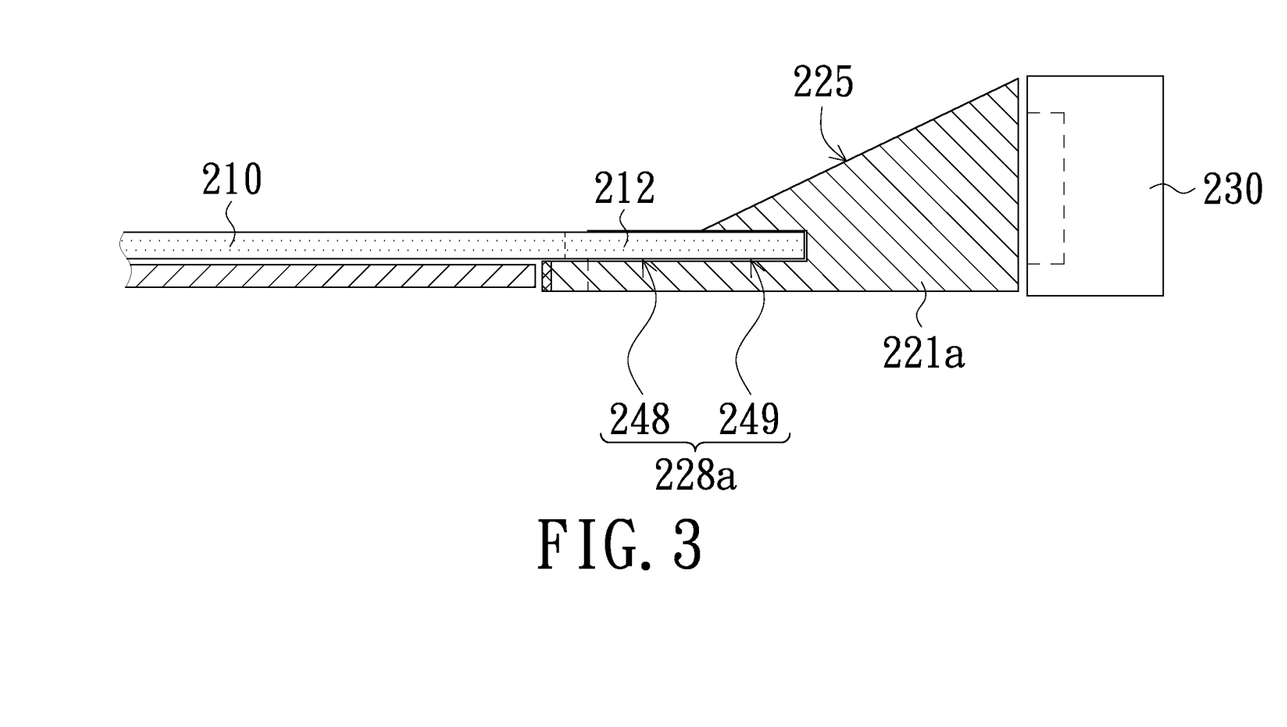
FIG. 3 is an alternative schematic cross-sectional view of the backlight module along a line A-A in FIG. 2A.

FIG. 3 is an alternative schematic cross-sectional view of the backlight module along a line A-A in FIG. 2A. As shown, the structure illustrated in FIG. 3 is similar to the structure illustrated in FIG. 2C, and the following description will be only focused on the differences between the two. In each light coupling device 221a as illustrated in FIG. 3, a portion of the first joint part 228a is covered by the top surface 225. In other words, the first joint part 228a further, besides the joint groove 248, includes a joint hole 249 interconnected to the joint groove 248. Therefore, the second joint part 212 of the light guide plate 210 not only can be jointed to the joint groove 248 but also can be inserted into the joint hole 249.

Please refer back to FIGS. 2A, 2B and 2C. Each light coupling device 221 further includes a bearing part 229. The bearing part 229, connected to the second side 223 of the light coupling device 221 and having a thickness less than that of the second side 223, is configured to support the light guide plate 210. In particular, through the arrangement of these bearing parts 229, the light coupling unit 220 and the light guide plate 229 can be assembled to each other more easily and conveniently. In addition, one of the adjacent two light coupling devices 221 may further have a third joint part 241, and accordingly the other one may further have a fourth joint part 242; wherein the third joint part 241 and the fourth joint part 242 are configured to be jointed to each other so as to joint the adjacent two light coupling devices 221 to each other. In this embodiment, the third joint part 241 is, for example, a joint groove and the fourth joint part 242 is, for example, a joint pillar; however, it is to be noted that the present disclosure does not limit the structures of the third joint part 241 and the fourth joint potion 242. In addition, it is to be noted that the light coupling device 221 having only one adjacent light coupling device 221 can only have either the third joint part 241 or the fourth joint part 242; and the light coupling device 221 having two adjacent light coupling devices 221 can have the third joint part 241 and the fourth joint part 242 both.

Each light coupling device 221 may further include a plurality of microstructures 243. The microstructures 243 are disposed on the second side 223 of the associated light coupling device 221 and configured to scatter the light, emitted into the light guide plate 210 from the light coupling device 221, so as to prevent the light from resulting in hot spots on the light incident side 211 of the light guide plate 210. The microstructures 243 each have, for example, a semi-cylindrical, a triangular pillar, a trapezoidal pillar or a polygonal pillar structure, etc; wherein these semi-cylindrical pillars each may have a same (or, a different) diameter, these triangular pillars each may have a same (or, a different) top angle, and these trapezoidal pillars each may have its top (or, bottom) connected to the second side 223. In addition, each microstructure 243 is configured to have its bottom surface, the one connected to the second side 223, less than 100 microns.

Moreover, the microstructures 243 of each light coupling device 221 and the light incident side 211 of the light guide plate 210 are configured to have a dielectric layer 244 therebetween. The dielectric layer 244 is configured to have a refractive index different to the microstructure 243 has so as to refract and scatter the light while the light is emitting into the dielectric layer 244 from the microstructures 243. Specifically, the dielectric layer 244 is, for example, an air layer, optical clear adhesive, or a layer containing specific materials capable of providing the refracting and scattering features.

Each light coupling device 221 may further include a reflective layer 246 disposed on a side surface 245 of the bearing part 229. The reflective layer 246 is configured to prevent the light in the light coupling device 221 from emitting out from the side surface 245 so as to reduce light losses in the light coupling device 221. In addition, the backlight module 200 may further include a reflective film 250 disposed under the light guide plate 210. The reflective film 250 is configured to prevent the light in the light guide plate 210 from emitting out from the bottom surface 213 so as to reduce light losses in the light guide plate 210. In another embodiment, the reflective layer 246 can be omitted and the reflective film 250 is connected to the side surface 245 of the bearing part 229 so as to prevent the light in the light coupling device 221 from emitting out from the side surface 245.

Figure 4:
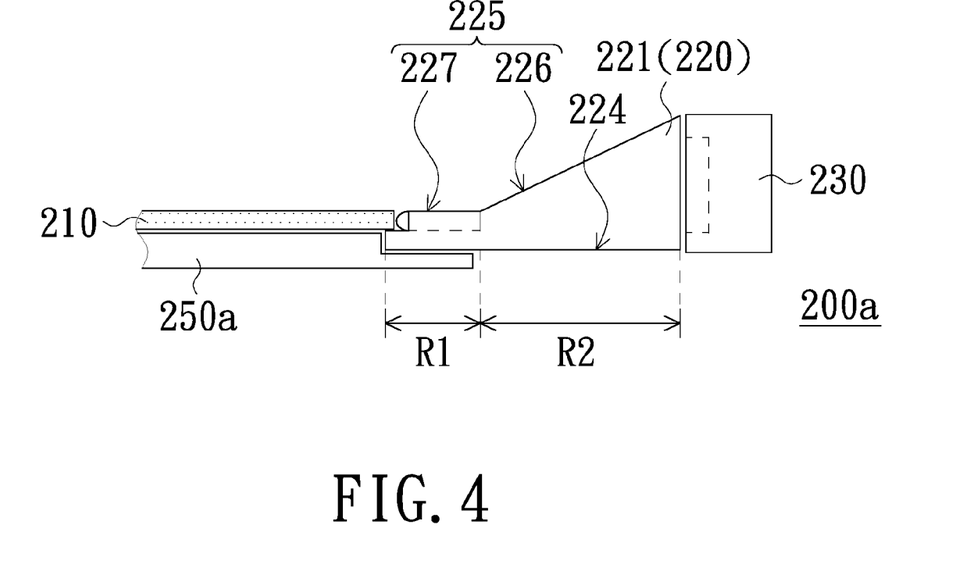
FIG. 4 is a schematic cross-sectional view of a backlight module in accordance with another embodiment of the present disclosure.

FIG. 4 is a schematic cross-sectional view of a backlight module in accordance with another embodiment of the present disclosure. As shown, the backlight module 200a in this embodiment is similar to the backlight module 200 in FIG. 2B; and the main difference between the two is related to the reflective film. In the backlight module 200a, the reflective film 250a is not only disposed under the light guide plate 210 but also further extends in a region R1; wherein the region R1 is a region defined on the bottom surface 224 of the light coupling device 221 corresponding to the second portion 227. Thus, the reflective film 250a can prevent the light in the light coupling device 221 from emitting out from the region R so as to reduce light losses in the light coupling device 221. In another embodiment, the reflective film is not required to extend under the region R1 if a reflective layer, configured to reflect light, is coated on the region R1.

In addition, because stray light emitted out from the first portion 226 is intended to emit toward an area above the light guide plate 210 and consequently the display quality of a display panel (not shown) disposed above the light guide plate 210 may be affected by the stray light, it is to be noted that the reflective film 250a in this embodiment is configured not to extend in a region R2; wherein the region R2 is a region defined on the bottom surface 224 of the light coupling device 221 corresponding to the first portion 226. Thus, the stray light, derived from the light in the light coupling device 221 reflected by the reflective film 250a and consequently emitted out from the first portion 226, is prevented.

Figure 5:
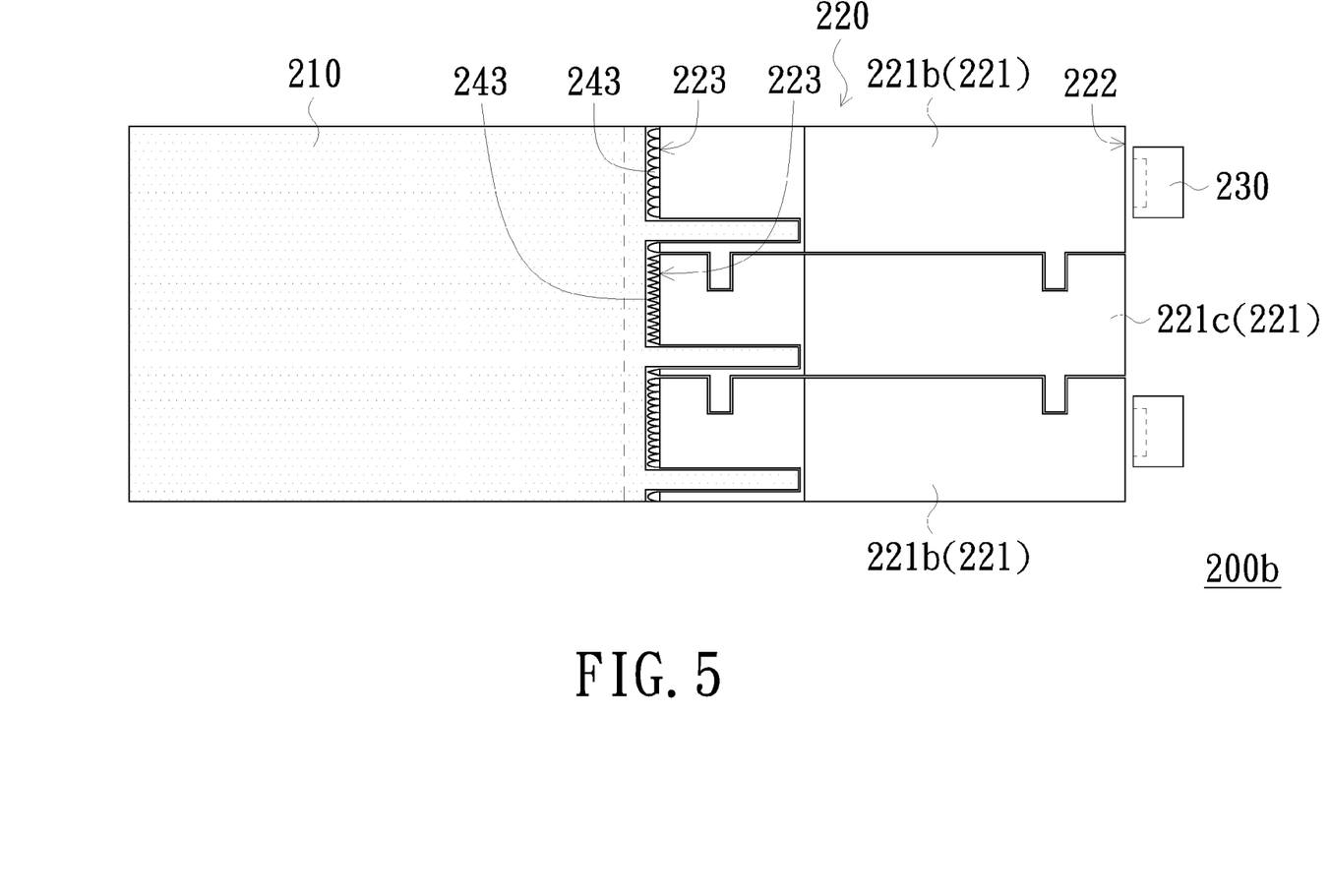
FIG. 5 is a schematic top view of a backlight module in accordance with another embodiment of the present disclosure.

FIG. 5 is a schematic top view of a backlight module in accordance with another embodiment of the present disclosure. As shown, the backlight module 200b in this embodiment is similar to the backlight module 200 in FIG. 2A; and the main difference between the two is related to the light coupling unit. In the backlight module 200b, the light coupling devices 221 of the light coupling unit 220 are constituted by a plurality of first light coupling devices 221b and at least one second light coupling device 221c. The second light coupling device 221c is disposed between the adjacent two first light coupling devices 221b. The light emitting devices 230 are respectively disposed beside the first side 222 of the first light coupling devices 221b and configured to provide light into the first light coupling devices 221b. It is to be noted that, even the second light coupling device(s) 221c is not correspondingly provided with a light emitting device 230, the light in the first light coupling devices 221b still can be transmitted into the second light coupling device(s) 221c. Moreover, in order to avoid the uneven brightness issue, caused by the first light coupling devices 221b and the second light coupling device(s) 221c, on the light incident side 211 of the light guide plate 210 and thereby further resulting in obvious hot spots, in this embodiment the first light coupling device 221b is configured to have a refractive index greater than the second coupling device 221c has, so as to improve the incident angle of the light emitted into the second coupling device 221c from the first light coupling device 221b. Thus, the light energy emitted into the light guide plate 210 from the second light coupling device(s) 221c can increase so as to avoid the aforementioned hot spots.

In addition, because the first light coupling device 221b and the second light coupling device 221c may have a different light pattern, the microstructure 243 disposed on the second side 223 of the first light coupling device 221b may be configured to have a structure different to the microstructure 243 disposed on the second side 223 of the second light coupling device 221c, and thereby modulating the first light coupling device 221b and the second light coupling device 221c can have a similar light pattern so as to prevent the light emitted from the microstructures 243 from resulting in hot spots in the light guide plate 210.

Figure 6:
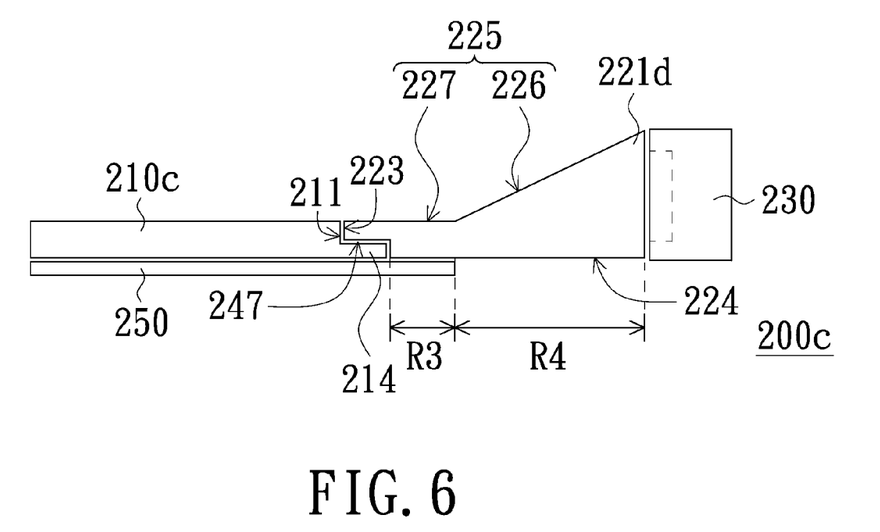
FIG. 6 is a schematic cross-sectional view of a backlight module in accordance with another embodiment of the present disclosure.

FIG. 6 is a schematic cross-sectional view of a backlight module in accordance with another embodiment of the present disclosure. As shown, the backlight module 200c in this embodiment has a structure similar to that of the backlight module 200 in FIG. 2B; and the following description will be only focused on the differences between the two. In the backlight module 200c, each light coupling device 221d does not have the bearing part 229 as shown in FIG. 2B; instead, the second side 223 of each light coupling device 221d is configured to have a nick structure 247 and correspondingly the light guide plate 210c further includes a joint-block structure 214 connected to the light incident side 211 thereof. The joint-block structure 214 is configured to bear on the nick structure 247 so as to joint the light guide plate 210c and the light coupling devices 221 to each other. In addition, the backlight module 200c may further include a reflective film 250 disposed under the light guide plate 210c and extending in a region R3; wherein the region R3 is a region defined on the bottom surface 224 of the light coupling device 221d corresponding to the second portion 227 of the top surface 225. In addition, because stray light emitted out from the first portion 226 is intended to emit toward an area above the light guide plate 210c and consequently the display quality of a display panel (not shown) disposed above the light guide plate 210c may be affected by the stray light, it is to be noted that the reflective film 250 in this embodiment is configured not to extend in a region R4; wherein the region R4 is a region defined on the bottom surface 224 of the light coupling device 221d corresponding to the first portion 226. Thus, the stray light, derived from the light in the light coupling device 221d reflected by the reflective film 250 and consequently emitted out from the first portion 226, is prevented.

Figure 7:
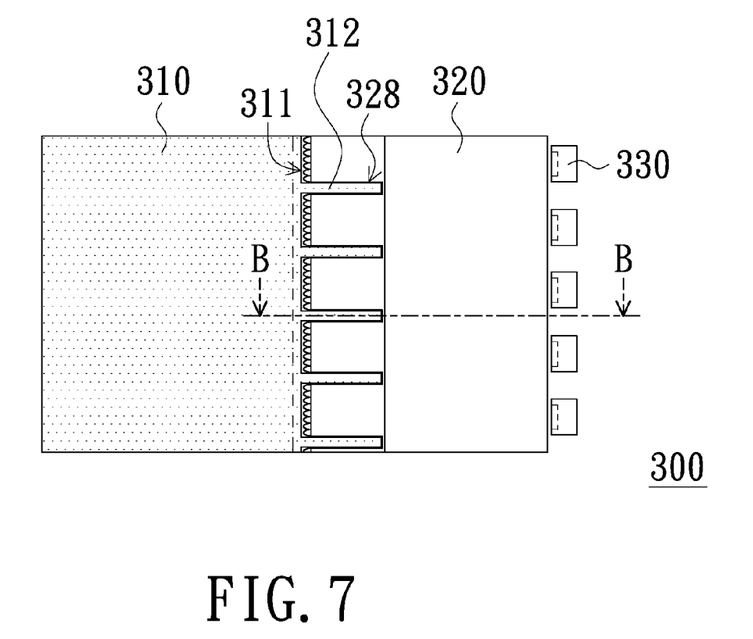
FIG. 7 is a schematic top view of a backlight module in accordance with another embodiment of the present disclosure.
Figure 8:
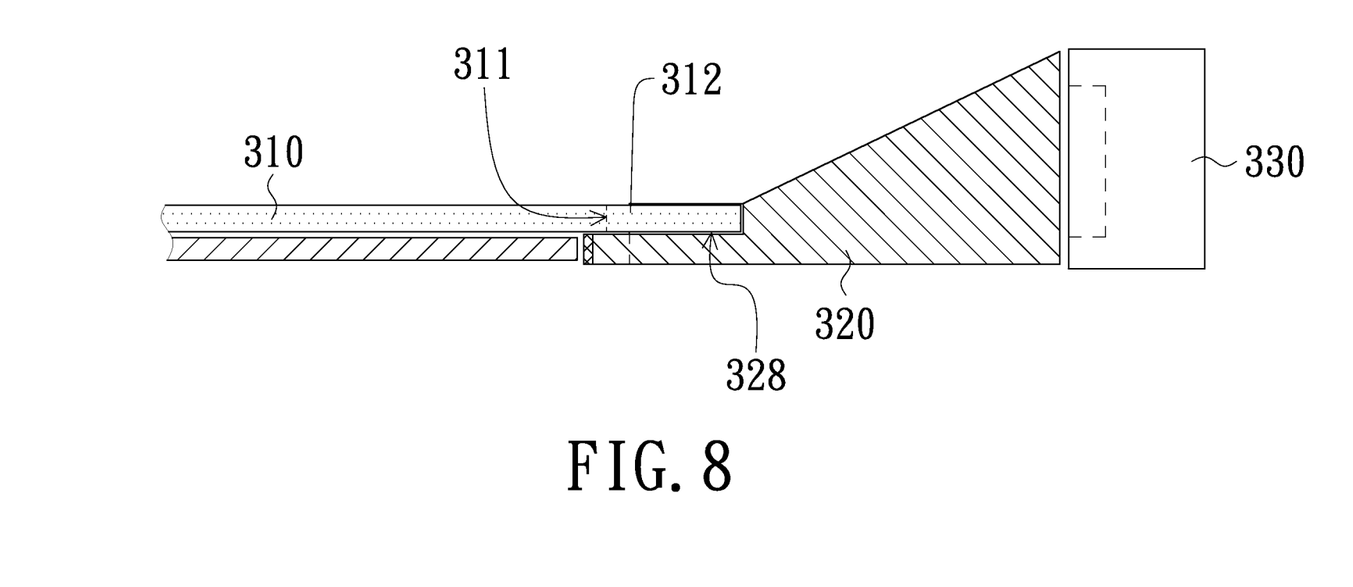
FIG. 8 is a schematic cross-sectional view of the backlight module along a line B-B in FIG. 7.

It is to be noted that the light coupling unit in the backlight module disclosed in the aforementioned embodiments can have a solid structure; and these light coupling devices can be integrated to have a one-piece structure. FIG. 7 is a schematic top view of a backlight module in accordance with another embodiment of the present disclosure. FIG. 8 is a schematic cross-sectional view of the backlight module along a line B-B in FIG. 7. Please refer to FIGS. 7, 8 both. The backlight module 300 in this embodiment has a structure similar to that of the aforementioned backlight module 200, and the following description will be only focused on the differences between the two. In the backlight module 300, instead of being constituted by a plurality of light coupling devices, the light coupling unit 320 is configured to have a one-piece solid structure. The first joint part 328 of the light coupling unit 320 includes a plurality of joint grooves. The second joint part 312, connected to the light incident side 311, of the light guide plate 310 includes a plurality of joint pillars. In particular, the first joint part 328 and the second joint part 312 can be jointed to each other through the joint of the joint grooves and the joint pillars.

Figure 9:
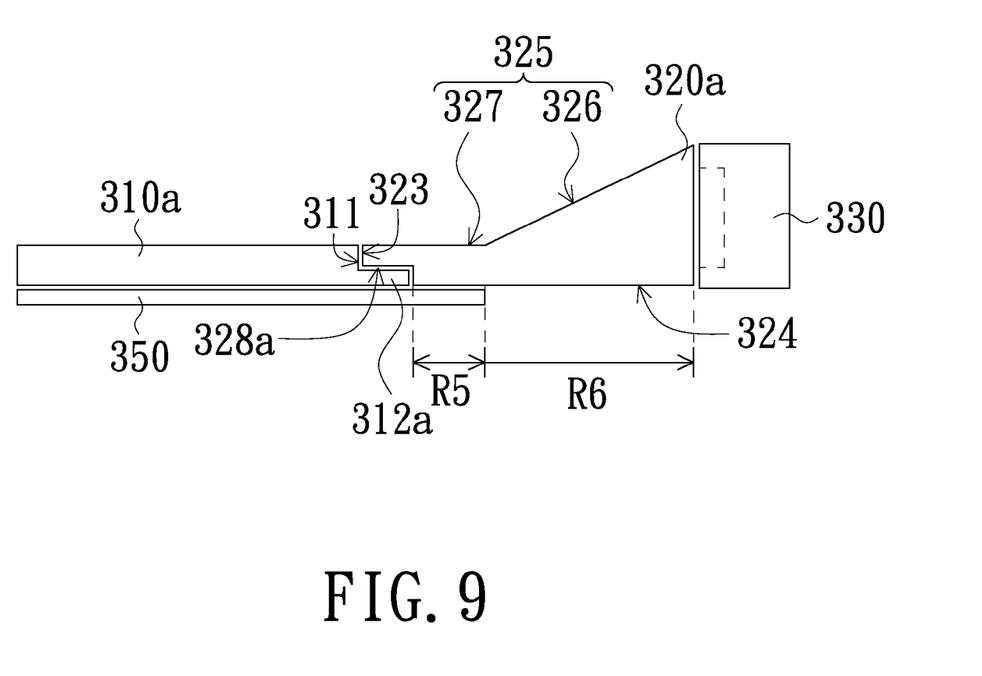
FIG. 9 is a schematic cross-sectional view of a backlight module in accordance with another embodiment of the present disclosure.

In this embodiment, because having a solid structure, the light coupling unit 320 can have some advantages such as enhanced structural strength and easy-to-production. In addition, through the joint of the first joint part 328 and the second joint part 312, the light coupling unit 320 and the light guide plate 310 can be assembled to each other more easily and conveniently. Herein, it is to be noted that the present disclosure does not limit the structures of the first joint part 328 and the second joint part 312. FIG. 9 is a schematic cross-sectional view of a backlight module in accordance with another embodiment of the present disclosure. As shown, the first joint part 328a of the light coupling unit 320a is, for example, a nick structure and formed on the second side 323 of the light coupling unit 320a. The second joint part 312a of the light guide plate 310a is, for example, a joint-block structure connected to the light incident side 311 of the light guide plate 310a. The joint-block structure is configured to bear on the nick structure so as to joint the light guide plate 310a and light coupling unit 320a to each other. In addition, a reflective film 350 may be disposed under the light guide plate 310c and extends in a region R5; wherein the region R5 is a region defined on the bottom surface 324 of the light coupling unit 320a corresponding to the second portion 327 of the top surface 325. In addition, because stray light emitted out from the first portion 326 is intended to emit toward an area above the light guide plate 310c and consequently the display quality of a display panel (not shown) disposed above the light guide plate 310c may be affected by the stray light, it is to be noted that the reflective film 350 in this embodiment is configured not to extend in a region R6; wherein the region R6 is a region defined on the bottom surface 324 of the light coupling unit 320a corresponding to the first portion 326. Thus, the stray light, the light in the light coupling unit 221d and derived from the light emitting device 330 and reflected by the reflective film 350 and consequently emitted out from the first portion 326, is prevented.

To sum up, the backlight module according to the present disclosure can be summarized to at least have the following advantages.

1. In one embodiment, because being constituted by a plurality of light coupling devices, the light coupling unit can have an enhanced structural strength. In addition, because having a relatively small size, the light coupling device can have the advantage of easy-to-production.

2. In another embodiment, because having a one-piece solid structure, the light coupling unit can have the advantages of enhanced structural strength and easy-to-production. In addition, through the joint of the first and second joint parts, the light coupling unit and the light guide plate can be assembled to each other more easily and conveniently.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A backlight module, comprising:
   a light guide plate having a light incident side;
   a light coupling unit comprising a plurality of light coupling devices arranged in a side-by-side manner, each light coupling device having a first side and a second side, the first and second sides being opposite to each other, the second side being adjacent to the light incident side, each light coupling device being configured to have a thickness gradually decreasing from the first side toward the second side wherein each light coupling device further has a first joint part, the light guide plate further has a plurality of second joint parts connected to the light incident side, each first joint part comprises a joint groove extending along a first direction and each second joint part comprises a joint pillar extending along the first direction, the joint pillars are respectively inserted with the joint grooves for limiting a movement of the light coupling unit along a second direction parallel to a long edge direction of the second side, and the first direction intersects the second direction; and
   a plurality of light emitting devices disposed beside the first sides of the light coupling devices.

2. The backlight module according to claim 1, wherein each light coupling device further has a bottom surface and a top surface, the bottom surface and the top surface are connected to the first and second sides, the top surface has a first portion, which is inclined relative to the bottom surface, and a second portion, which is parallel to the bottom surface, the second portion is connected to the second side and the first portion is connected between the first side and the second portion.

3. The backlight module according to claim 1, wherein each light coupling device is configured to have its first joint part on the top surface of the light coupling device.

4. The backlight module according to claim 2, wherein each light coupling device further comprises a bearing part connected to the second side, the bearing part is configured to have a thickness less than that of the second side, and the light guide plate is configured to bear on the bearing parts of the light coupling devices.

5. The backlight module according to claim 4, further comprising a reflective film disposed under the light guide plate and connected to a side surface of each bearing part of each light coupling device.

6. The backlight module according to claim 5, wherein the reflective film further extends in a region defined on the bottom surfaces of the light coupling devices corresponding to the second portions.

7. The backlight module according to claim 4, wherein each light coupling device further comprises a reflective layer disposed on a side surface of the bearing part thereof.

8. The backlight module according to claim 2, wherein the second side of each light coupling device is configured to have a nick structure, the light guide plate further comprises a joint-block structure connected to the light incident side thereof, the joint-block structure is configured to bear on the nick structures.

9. The backlight module according to claim 8, further comprising a reflective film disposed under the light guide plate and extending in a region defined on the bottom surfaces of the light coupling devices corresponding to the second portions.

10. The backlight module according to claim 1, wherein one of the adjacent two light coupling devices comprises a third joint part, the other one comprises a fourth joint part, the third joint part and the fourth joint part are configured to be jointed to each other.

11. The backlight module according to claim 10, wherein the third joint part comprises a joint groove and the fourth joint part comprises a joint pillar.

12. The backlight module according to claim 1, wherein each light coupling device further comprises a plurality of microstructures disposed on the second side.

13. The backlight module according to claim 12, wherein the microstructures of each light coupling device and the light incident side of the light guide plate are configured to have a dielectric layer therebetween, the dielectric layer is configured to have a refractive index different than the microstructures have.

14. The backlight module according to claim 1, wherein each light coupling device is configured to have a solid structure.

15. The backlight module according to claim 14, wherein the light coupling devices include a plurality of first light coupling devices and at least a second light coupling device, the second light coupling device(s) is disposed between the adjacent two first light coupling devices, each first light coupling device is configured to have a refractive index greater than each second light coupling device has.

16. A backlight module, comprising:
a light guide plate having a light incident side;
a light coupling unit, the light coupling unit being a solid structure and having a first side and a second side opposite to the first side, the second side being adjacent to the light incident side, the light coupling unit being configured to have a thickness gradually decreasing from the first side toward the second side, the light coupling unit further comprising a first joint part, the light guide plate further comprising a second joint part connected to the light incident side, the first joint part and the second joint part are configured to be jointed to each other wherein the first joint part comprises a plurality of joint grooves, each joint groove extends along a first direction and the second joint part comprises a plurality of joint pillars, each joint pillar extends along the first direction, the joint pillars are respectively inserted with the joint grooves for limiting a movement of the light coupling unit along a second direction parallel to a long edge direction of the second side, and the first direction intersects the second direction; and
a plurality of light emitting devices disposed beside the first side of the light coupling unit.

17. The backlight module according to claim 16, wherein the light coupling unit further has a bottom surface and a top surface, the bottom surface and the top surface are connected to the first and second sides, the top surface has a first portion, which is inclined relative to the bottom surface, and a second portion, which is parallel to the bottom surface, the second portion is connected to the second side and the first portion is connected between the first side and the second portion.

18. The backlight module according to claim 16, wherein the light coupling unit is configured to have its first joint part on the top surface of the light coupling unit.

19. The backlight module according to claim 17, wherein the light coupling unit further comprises a bearing part connected to the second side, the bearing part is configured to have a thickness less than that of the second side, and the light guide plate is configured to bear on the bearing part.

20. The backlight module according to claim 19, further comprising a reflective film disposed under the light guide plate and connected to a side surface of the bearing part.

21. The backlight module according to claim 20, wherein the reflective film further extends in a region defined on the bottom surface of the light coupling unit corresponding to the second portion.

22. The backlight module according to claim 19, wherein the light coupling unit further comprises a reflective layer disposed on a side surface of the bearing part thereof.

23. The backlight module according to claim 17, wherein the first joint part of the light coupling unit comprises a nick structure formed on the second side, the second joint part of the light guide plate comprises a joint-block structure connected to the light incident side, the joint-block structure is configured to bear on the nick structure.

24. The backlight module according to claim 23, further comprising a reflective film disposed under the light guide plate and extending in a region defined on the bottom surface of the light coupling unit corresponding to the second portion.

25. The backlight module according to claim 16, wherein the light coupling unit further comprises a plurality of microstructures disposed on the second side.

26. The backlight module according to claim 25, wherein the microstructures of the light coupling unit and the light incident side of the light guide plate are configured to have a dielectric layer therebetween, the dielectric layer is configured to have a refractive index different than the microstructures have.

27. The backlight module according to claim 1, wherein two laterals of each joint pillar are respectively abutted on two laterals of the one joint groove.

28. The backlight module according to claim 3, wherein each light coupling device is configured to have its first joint part partly covered by the top surface thereof.

29. The backlight module according to claim 16, wherein two laterals of each joint pillar are respectively abutted on two laterals of the one joint groove.

30. The backlight module according to claim 18, wherein the light coupling unit is configured to have its first joint part partly covered by the top surface thereof.

* * * * *